June 6, 1961  P. STÜCKLIN  2,987,077

RETURN ADMIXING VALVES FOR HOT WATER HEATING SYSTEMS

Filed Jan. 13, 1958

PAUL STÜCKLIN
INVENTOR

By Wenderoth, Lind & Ponack
Attys

United States Patent Office 2,987,077
Patented June 6, 1961

2,987,077
RETURN ADMIXING VALVES FOR HOT WATER HEATING SYSTEMS
Paul Stücklin, Basel, Switzerland, assignor to Stücklin & Cie., a Swiss company
Filed Jan. 13, 1958, Ser. No. 708,692
Claims priority, application Switzerland Jan. 15, 1957
2 Claims. (Cl. 137—599.1)

When, in hot-water heating systems, the water temperature in the heater or in an accumulator is higher than the water temperature required in the hot water heating mains, return admixing valves are used to lower the temperature. This may be accomplished by means of a plurality of conventional controlling or regulating elements or by means of a mixing device which forms a compact unit.

As long as it has been customary to lead the return of the hot water heating mains into the foot of the heater, mixing valves were sufficient for this purpose in which at least two ports were opened and closed respectively, for controlling the mixing ratio. Such valves are of relatively simple construction and, thus, relatively cheap.

In modern practice, however, the return of a hot water heating system is connected to the heater on the same or approximately same level as the supply mains, in which case, however, said simple valves are no longer sufficient.

It is an object of the present invention to provide a return admixing valve for hot water heating systems for use where the hot water return is connected to the heater on the same or approximately the same level as the supply mains.

Figure 1:
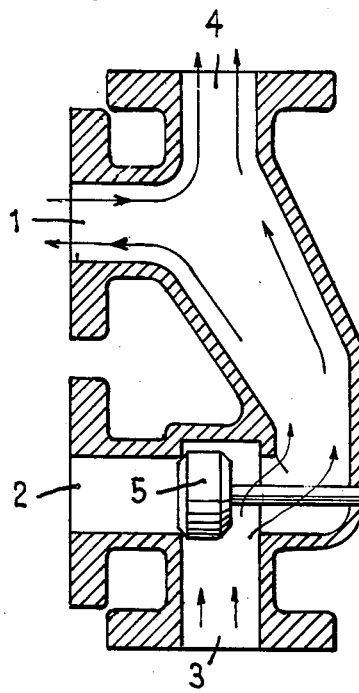
Figure 2:
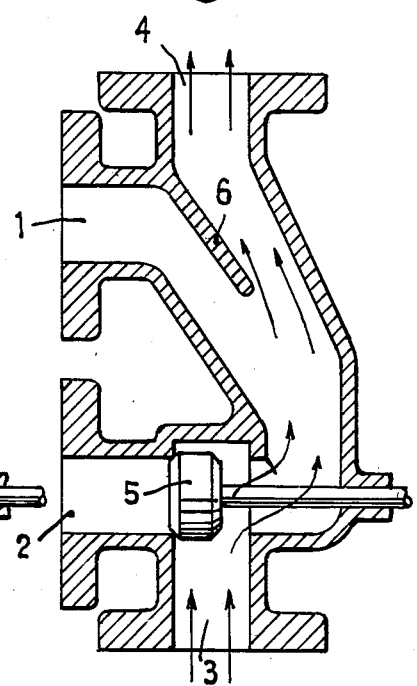
Figure 3:
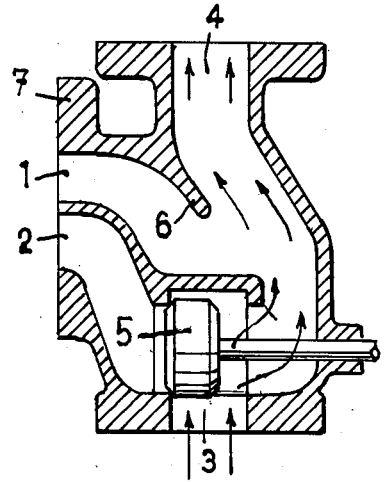

The valve according to the invention is illustrated in the accompanying drawings in which FIG. 1 is a sectional elevation view of a conventional admixing valve;

FIG. 2 is a sectional elevation view of the admixing valve according to the present invention; and FIG. 3 is a sectional elevation view of a modified form of the admixing valve according to the present invention.

When, for example and as shown in FIG. 1, such a valve is directly connected to a heater by corresponding unions 1 and 2 which have a common plane of abutment, the following deficiency arises:

Assuming, the water return for water from the heating system enters through inlet 3 and is caused by the closed valve setting to move to outlet 4, without any admixture of hot water therewith, a counterflow is produced in heater union 1. Since in a water circulating system water of a higher temperature tends to rise to the highest point of the system, hot water from the hot heater will rise and will flow along the top of union 1 into the hot water heating system while through one and the same pipe cross-section a portion of the cooler water from the system will sink and flows back into the heater through the lower half portion of the pipe cross-section, so that in spite of the valve 5 being closed, an undesired admixture and thus a rise in temperature will result in the system water.

The same consideration applies to the case when, perhaps by a different arrangement, the regulating element 5 is moved from the heater port 2 into the heater port 1. In this case also, the undesired admixing cannot be avoided.

The present invention permits the use of a mixing valve which is controlled through only two ports and in which the undesired counterflow is prevented, in accordance with the invention, by a corresponding baffle construction in the duct in which a counterflow tends to build up.

An embodiment of the present invention of this kind is shown in FIG. 2, in which a separating baffle 6 is provided between the heater port 1 and outlet 4 to extend the conduit 1 so that the end thereof toward the system is below the lowest level of the remainder thereof, which baffle has a counterflow preventing effect.

Inasmuch as cool water will accumulate, in an open space, below the warmer water, no cool water will flow, due to the separating baffle 6, from the mixing valve to the heater and no warm water will flow, reversely, through the mixing valve to the feed water.

In order to cheapen the valve with respect to weight and finishing expense, the two heater ports 1 and 2 may—as shown in FIG. 3—be combined in a single flange 7 whereby also the attachment of the mixing valve on the heater is simplified. When, in particular in steel heaters, the counterflange junctions for the ports 1 and 2 of the mixing valve shown in Fig. 2 are welded-in, welding stresses are apt to arise which again call for alining operations and which render difficult the sealing of these points. The single-flange construction, as provided in the mixing valve shown in FIG. 3, materially simplifies the junction to the steel heater.

What I claim as new, is:

1. A return admixing valve for hot water heating systems comprising a valve casing having a passage therethrough with a hot water outlet on one end and a cooler water inlet on the other end, a first valve seat in said passage, said casing having a cooler water outlet from said passage between said cooler water inlet and said valve seat, a second valve seat in said cooler water outlet, a valve movable between said valve seats, said casing having a hot water inlet to said passage between said first valve seat and said hot water outlet, said hot water inlet extending substantially perpendicularly to said passage, and a baffle extending into the junction between said passage and said hot water inlet extending the end of said hot water inlet at said passage toward said cooler water inlet a distance which is greater than the diameter of the hot water inlet.

2. A return admixing valve as claimed in claim 1 in which said cooler water outlet and said hot water inlet are in a single portion of said valve casing.

References Cited in the file of this patent

UNITED STATES PATENTS

| 172,117 | Hardy | Jan. 11, 1876 |
| 768,020 | Gold | Aug. 16, 1904 |
| 1,040,548 | Jones | Oct. 8, 1912 |
| 2,836,197 | Johnson | May 27, 1958 |

FOREIGN PATENTS

| 330,127 | Great Britain | June 5, 1930 |